United States Patent
Bistis et al.

(10) Patent No.: US 9,242,177 B2
(45) Date of Patent: Jan. 26, 2016

(54) SIMULATED SPORTS EVENTS UTILIZING AUTHENTIC EVENT INFORMATION

(75) Inventors: Lori Marie Bistis, West Hartford, CT (US); Christiaan Cokas, Niantic, CT (US); Michael Gay, Collinsville, CT (US); Jesse Pringle, Plantsville, CT (US); Marc William Rowley, Westport, CT (US); Aaron Watson, Thomaston, CT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/368,510

(22) Filed: Feb. 8, 2012

(65) Prior Publication Data

US 2012/0202594 A1    Aug. 9, 2012

Related U.S. Application Data

(60) Provisional application No. 61/440,675, filed on Feb. 8, 2011.

(51) Int. Cl.
| | |
|---|---|
| A63F 13/00 | (2014.01) |
| A63F 9/24 | (2006.01) |
| A63F 13/20 | (2014.01) |
| A63F 13/213 | (2014.01) |
| A63F 13/40 | (2014.01) |
| A63F 13/52 | (2014.01) |
| H04N 5/272 | (2006.01) |
| G06T 15/20 | (2011.01) |
| G06T 19/00 | (2011.01) |

(52) U.S. Cl.
CPC ............... *A63F 13/20* (2014.09); *A63F 13/213* (2014.09); *A63F 13/40* (2014.09); *A63F 13/52* (2014.09); *G06T 15/20* (2013.01); *G06T 19/006* (2013.01); *H04N 5/272* (2013.01)

(58) Field of Classification Search
CPC ................... A63F 2300/10; A63F 2300/1006; A63F 2300/105; A63F 2300/1062; A63F 2300/1087; A63F 2300/1093; A63F 2300/69; A63F 13/20; A63F 13/213; A63F 13/217; A63F 13/40; A63F 13/45; A63F 13/52; A63F 13/533; G06T 2207/10016; G06T 2207/10021
USPC ........... 463/2, 3, 7, 30–34, 36–43; 273/317.1, 273/317.6
See application file for complete search history.

(56) References Cited

U.S. PATENT DOCUMENTS

| | | | |
|---|---|---|---|
| 6,080,063 A * | 6/2000 | Khosla | 463/42 |
| 6,292,706 B1 * | 9/2001 | Birch et al. | 700/91 |
| 6,767,282 B2 * | 7/2004 | Matsuyama et al. | 463/3 |
| 7,022,014 B2 * | 4/2006 | Namba et al. | 463/4 |
| 8,083,589 B1 * | 12/2011 | Kavars et al. | 463/36 |
| 8,176,518 B1 * | 5/2012 | Junkin et al. | 725/61 |
| 8,210,947 B2 * | 7/2012 | Nanba | 463/42 |
| 8,235,815 B1 * | 8/2012 | Kavars et al. | 463/36 |
| 9,089,775 B1 * | 7/2015 | Daniel | A63F 13/20 1/1 |

(Continued)

*Primary Examiner* — Milap Shah

(74) *Attorney, Agent, or Firm* — Ference & Associates LLC

(57) ABSTRACT

Described herein are methods, systems, apparatuses and products for simulating events utilizing authentic event information. One aspect provides receiving event data associated with one or more real-world events at one or more event data software modules being executed on a computing device; and formatting the event data via the one or more event data software modules into a form utilized by one or more video game applications operable on the computing device. Other embodiments are disclosed.

16 Claims, 4 Drawing Sheets

(56) References Cited

U.S. PATENT DOCUMENTS

| | | | |
|---|---|---|---|
| 2001/0003715 A1* | 6/2001 | Jutzi et al. | 463/40 |
| 2004/0224740 A1* | 11/2004 | Ball et al. | 463/6 |
| 2005/0113158 A1* | 5/2005 | Sterchi et al. | 463/3 |
| 2005/0130725 A1* | 6/2005 | Creamer et al. | 463/1 |
| 2005/0213817 A1* | 9/2005 | Miyamori | G06T 7/20 382/181 |
| 2007/0296723 A1* | 12/2007 | Williams | 345/473 |
| 2008/0005775 A1* | 1/2008 | Belton et al. | 725/139 |
| 2008/0261693 A1* | 10/2008 | Zalewski | 463/31 |
| 2009/0029754 A1* | 1/2009 | Slocum et al. | 463/5 |
| 2009/0143124 A1* | 6/2009 | Hughes et al. | 463/2 |
| 2009/0221374 A1* | 9/2009 | Yen et al. | 463/42 |
| 2009/0258685 A1* | 10/2009 | Gaidos et al. | 463/1 |
| 2010/0029352 A1* | 2/2010 | Angelopoulos | 463/4 |
| 2010/0271367 A1* | 10/2010 | Vaden et al. | 345/420 |
| 2012/0142421 A1* | 6/2012 | Kennedy, Jr. | 463/39 |

* cited by examiner

SIMULATED SPORTS EVENTS UTILIZING AUTHENTIC EVENT INFORMATION

CROSS REFERENCE TO RELATED APPLICATION

This application claims the benefit of U.S. Provisional Patent Application No. 61/440,675, entitled "Interaction with Content Through Human-Computer-Interface," filed Feb. 8, 2011, the contents of which are incorporated by reference as if fully set forth herein

FIELD OF THE INVENTION

The subject matter described herein generally relates to video game systems and arrangements for game play in particular.

BACKGROUND

Video game user experiences have become incredibly sophisticated and life-like. Recent developments now allow users to manipulate game elements through physical movement, instead of by just pressing a button on a game controller. Compared to predecessor systems, game system graphics and data processing allow for more realistic visual environments than previously possible. In addition, certain game system controller devices provide haptic effects, including producing vibrations responsive to certain game events, such as hitting a baseball or colliding with an object. As a result, users expect increasingly immersive and realistic game play environments.

Recent developments in video game systems have opened up a new world of immersive game play. A prominent advance was the ability of users to interact with game environments through movement captured and analyzed by motion detecting input devices. For example, a user playing a baseball video game may now hit a baseball by physically swinging his arms in a motion mimicking a real-life baseball swing. In comparison, traditional game systems were limited to game controllers that could only swing a bat at a baseball through mere button presses. Exemplary systems that allow for motion game play include the Nintendo WII, Microsoft XBOX 360 KINECT, and Sony PLAYSTATION Move systems. WII is a registered trademark of Nintendo. XBOX and KINECT are registered trademarks of Microsoft Corporation. PLAYSTATION is a registered trademark of Sony Computer Entertainment, Inc. Other advances in video game development include life-like graphics, haptic output, audio capture, and multi-player games wherein remote players interact in a common virtual environment. As a result of these developments, game system users are increasingly demanding more realistic and life-like game experiences and content.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Due to recent advances in video game system technology, users are increasingly demanding more realistic and life-like game experiences and content. Accordingly, embodiments provide game systems configured to provide authentic game play experiences through, inter alia, the integration of authentic, real-world information into a virtual game play environment. For example, an embodiment may utilize information pertaining to an actual event to manipulate video game elements. As a non-limiting example, the information pertaining to an actual event may be historical data, real-time data (i.e., essentially real-time data), or some combination thereof. According to embodiments, the video game elements may be manipulated to present to a user a simulation based on an actual event based on event data associated with said actual event.

Figure 1:
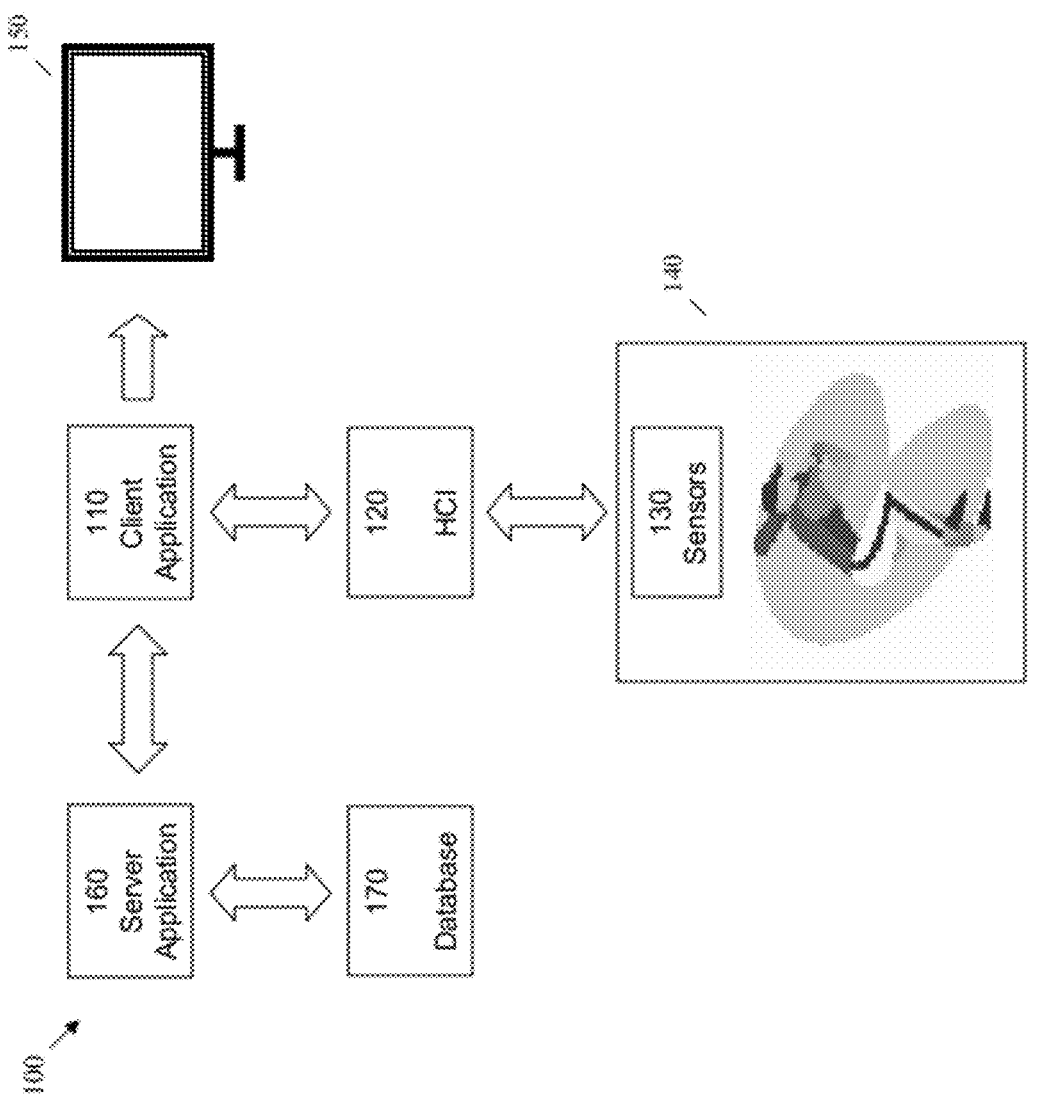
FIG. 1 provides an example video game system configured according to an embodiment.

Referring to FIG. 1, therein is provided an example video game system configured according to an embodiment. The example system 100 of FIG. 1 may be configured to include multiple computer elements, including the following: A client application 110, one or more human-computer interface (HCI) devices 120, one or more sensors 130, and displays 150. Embodiments may include a server application 160 and a database 170 that may be remotely or locally located and may be accessible, either by wire or wirelessly, for example, through the Internet or an Ethernet network.

The client application 110 may be arranged as a computing application that may run on any computer with sufficient processing power and memory, including, but not limited to, a general purpose computer (e.g., desktop PC or laptop), personal digital assistant (PDA), a mobile computing device (e.g., tablet computing device), or an embedded system such as a video game console. The client application 110 may receive control commands from one or more HCI devices, and, based on the specific application, processes data such as video and graphics. The client application 110 may additionally include a 3D rendering engine capable of 3D reconstruction of virtual and real objects and their projection to a screen 150 viewable by a user.

One or more HCI devices 120 may be used to capture and process the signals measured by one or more sensors 130. An exemplary function of the HCI device 120 involves recognition of scenes based on sensory data captured from the one or more sensors 130. Depending on the application, an HCI device 120 may translate the raw sensory data into metadata such as control data, a 3D model of objects in the scene, the location and motion of said objects, or combinations thereof. These metadata together with video may be sent to the client application 110 for further processing and rendering.

The client application 110 may access a database 170 directly, for example, via a server application 160, or indirectly, such as through one or more software modules (not shown) configured to interact directly with the database 170. The database 170 may contain information or virtual elements, such as graphics, playbooks, images, and video, statistical data about players and teams competing in various sporting events, and/or other data pertaining to other real-world events. The database 170 may also be used to store data collected from users 140. These data may be sensed 130 and transmitted, via the HCI devices 120 and the client application 110 to the server application 160 which, for example, may store it in the database 170 for future use.

Figure 2:
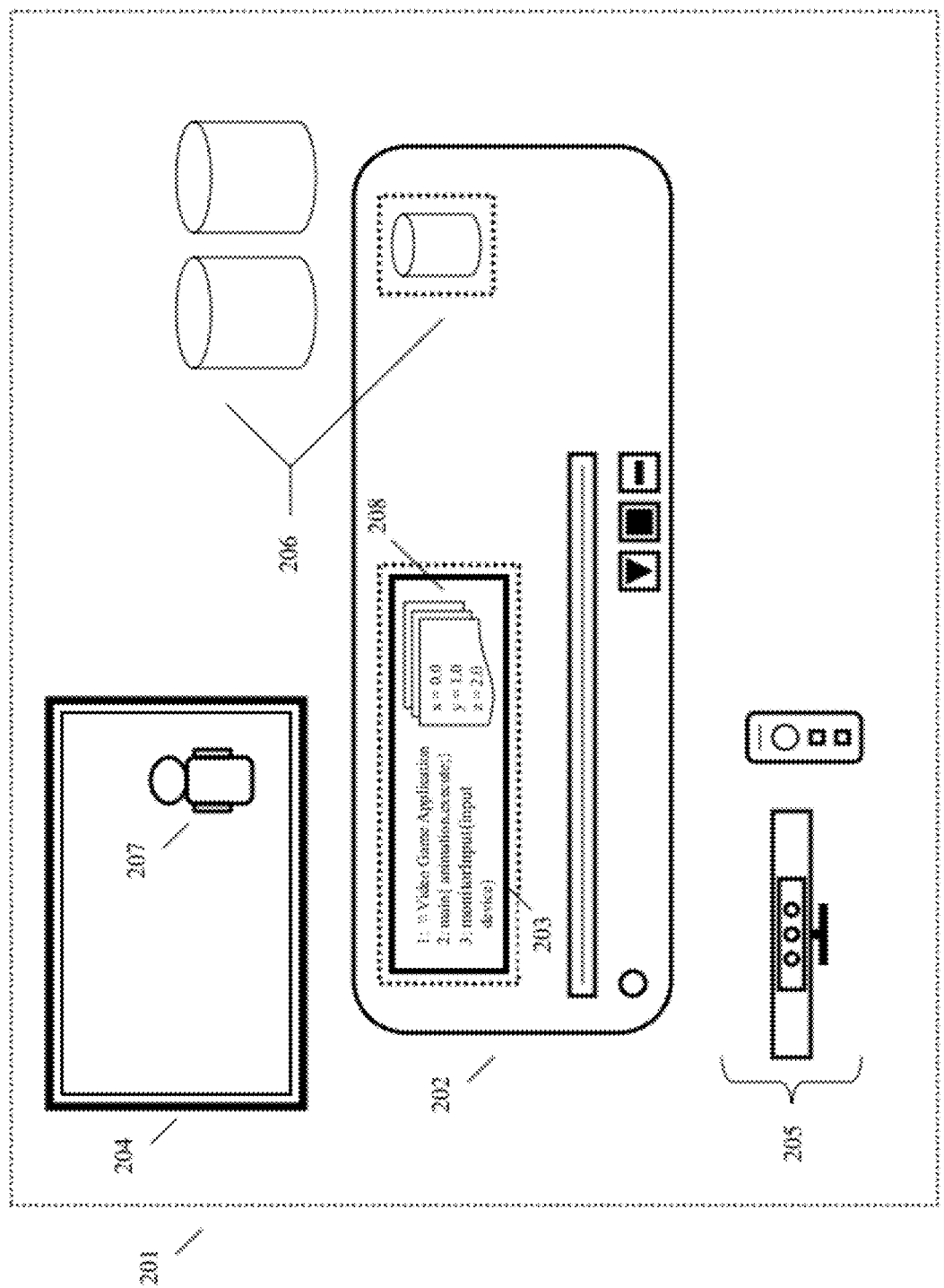
FIG. 2 provides another example video game system configured according to an embodiment.

In FIG. 2, therein is provided another example video game system configured according to an embodiment. The game system 201 is comprised of a video game console computer system 202 configured to execute a video game application 203. Users may interact with the game system 201 through one or more input devices 205, including video game controllers or image or motion capturing devices. The video game console system 202 may access one or more databases 206 comprising data pertaining to one or more authentic, real-world events. According to embodiments, the databases 206 may be completely or partially local to the video game system 201 or may be remote and accessible through one or more wired or wireless communication methods, including through the Internet, Ethernet, or WiFi, or may be accessible through one or more devices, such as another computing device or cable television converter device.

Execution of the video game application 203 results in the presentation of game objects 207 to a user through a display device 204. Particular game objects 207 may be specific to the video game application or subject of the video game application (e.g., avatar representations of the players or professional athletes). Illustrative and non-restrictive examples of game objects 207 of a racing game application may consist of at least the racing automobiles and the driving surface, while for a baseball game, they may consist of at least the baseball players, the baseball, the bases, pitches, and batter swings. According to embodiments, each graphical game object 207 may be associated with one or more data elements 208 configured to control operation of the graphical game object 207. According to embodiments, the one or more data elements may include, but are not limited to, parameters, data fields, program instructions, or combinations thereof. A non-limiting baseball game example provides that a pitch game object may be associated with x, y, and z coordinate information as well as data pertaining to velocity, amount of curve, beginning speed, and ending speed.

The one or more data elements 208 may be populated with information from the database(s) 206 containing data pertaining to authentic, real-world events. Accordingly, the game objects 207 may function according to data associated with an actual real-world event, such as a pass thrown in a football game, a shot taken in a hockey game, or a pitch thrown in a baseball game. For example, a user playing a baseball video game may be presented with a simulated version of a pitch thrown in an actual baseball game or a user playing a hockey video game may control a goalie object and attempt to block a simulated version of a shot taken in an actual hockey game.

A video game system arranged according to embodiments may access one or more databases providing event data obtained from multiple sources, for example, through event data firmware or event data software modules resident on the system. An illustrative and non-restrictive example of an event data database is a specialized database repository (SDR) which, in general, is a specialized repository developed to receive real time information updates, for example, for news, stock markets, and sports. A prominent example is the SDR operated by ESPN (Entertainment and Sports Programming Network) (hereinafter, the "ESPN SDR") and configured to receive, store, update, and index real-time sports information from multiple providers in real time. ESPN is a registered trademark of ESPN, Inc. These data can then be provided to multiple applications including immediate real-time broadcast applications such as sports commentators and graphic illustration software. Data stored in an SDR may be used for real-time, or near real time applications, such as the ESPN GAMECAST software configured to provide a graphical representation of a live sporting event in an Internet browser application, or stored for later searching and accessing during later parts of, and after a relevant sporting event. GAMECAST is a registered trademark of ESPN, Inc. Although the ESPN SDR is used as an example in this disclosure, embodiments are not so limited, as any database or repository capable of functioning in accordance with the disclosed embodiments is contemplated herein.

According to embodiments, an HCI device (e.g., video gaming system) may be connected to an SDR and used to facilitate a performance gameplay setting such that a simulated player may virtually perform a certain play. For example, the player may try to match or experience a specific performance of a professional sport athlete for which information may be extracted from an SDR.

The ESPN SDR may contain sports results and other data related to athletes and teams that compete in sporting events and may be updated in real-time receiving game data from national and international sporting events. For example, updates may occur at regular intervals or after completion of a particular play, such as a pitch, shot, or pass. These live game data may be received via feeds, such as scoreboards, league feeds, and third party feeds, validated, and indexed, and made readily available for content consumers. For example, during a live MAJOR LEAGUE BASEBALL (MLB) game, a client application (e.g., game console) configured according to an embodiment may query the ESPN SDR and request game information for one or more plays, such as the last play. MAJOR LEAGUE BASEBALL and MLB are registered trademarks of Major League Baseball Properties, Inc. The client application may use this play information to create a virtual play environment wherein a player may be able to virtually perform the subject play.

In a non-limiting example, a user, while watching a broadcast of ESPN's SUNDAY NIGHT BASEBALL, views a batter watching strike three cross the plate, ending the inning SUNDAY NIGHT BASEBALL is a registered trademark of ESPN, Inc. The interested user may wish to try to hit that same pitch himself, using, for example, a video gaming system configured according to embodiments. The user may invoke the video game system to query the ESPN SDR for the relevant data, for example, by interfacing with an HCI, such as through a menu system, text-based search, motion input, or by speaking a recognized phrase.

In a particular embodiment, a software module running (e.g., a "play the last play" software module) on the video game system may receive the signal input via the HCI and may automatically trigger a query to the ESPN SDR, or may present the user with an options menu that, based on the user's selection (e.g., whether the user wants to be the pitcher or the batter; whether the user wants the last pitch, or the last three, etc.), will trigger a query to the ESPN SDR. The query may include one or more query elements, including, but not limited to, time stamp data as well as data identifying which event the user is watching, which may be input by the user or automatically detected by reading the user's channel selection (e.g., via an interface with a cable set top box) or via audio or video recognition through the HCI device (e.g., the microphones on the HCI may pick up specific sounds from the broadcast game that can be matched against broadcasted sounds to locate the event).

Responsive to receiving the query, the ESPN SDR may respond with the relevant data (e.g., identity of playing pitcher and pitch performance data). The data may be sent to the software module, which may process the data and communicate it to the video game software. The software module may use the processed data to create and send an instruction to the video game software to select and present a predetermined video game scenario (e.g., a pitch) to the user that most closely matches the data from the real pitch the user desires to simulate.

In a certain embodiment, the video game software may be configured to receive and process the ESPN SDR data and use it to select a predetermined scenario. In another embodiment, rather than matching a predetermined scenario, the video game software uses the data to directly configure the presented scenario. For example, the pitch speed, amount of curve, and pitch location may be used to directly configure the graphics of a presented pitch. The user's virtual performance may then be compared with the performance of the professional athlete by the video game software (e.g., the real player hit a home run, but the user only hit a single) or may be compared with the performance of other users by sending data on the user's performance back to the ESPN SDR or other application at the broadcaster. For example, the ESPN SDR may aggregate data from multiple users and report the results back to the said users.

Figure 3:
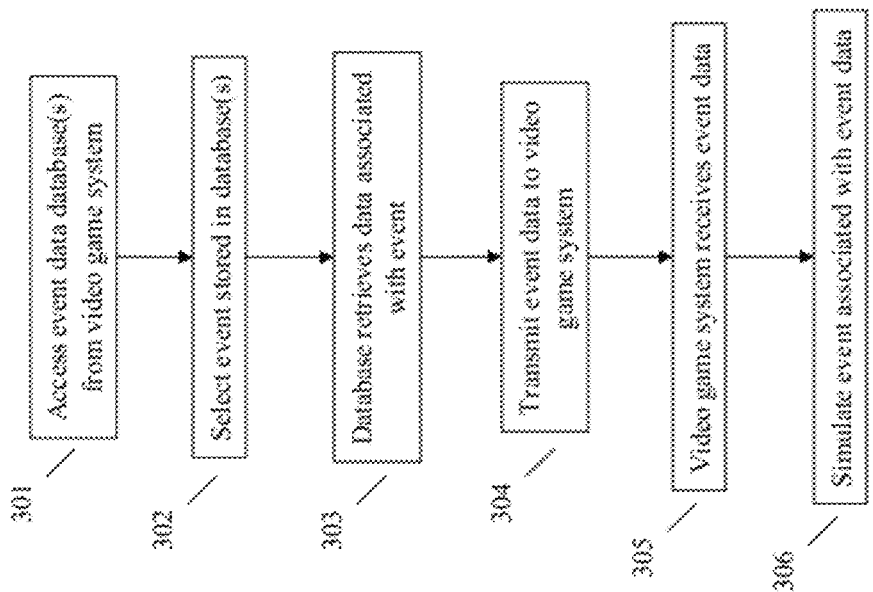
FIG. 3 provides an example event simulation process using authentic event data according to an embodiment

Referring to FIG. 3, therein is provided an example event simulation process using authentic event data according to an embodiment. A video game system is associated with one or more event databases 301. A user selects an event stored in the one or more database through the video game system 302. For example, a user may select the last play of a game being broadcast live, or may select from one or more past events from past games. The one or more databases retrieve the data associated with the event 303 and transmit the event data to the video game system 304. Alternatively, a server application 160 may query the database 170 to retrieve data associated with one or more events based on a request from the client application 110 on behalf of player's preferences. A video game application operating on the video game system obtains the event data 305 and integrates the data with the game elements to produce a simulation of the event associated with the event data 306.

Event data may be comprised of one or more categories of information or statistics arranged according to embodiments in one or more databases. An illustrative and non-limiting example provides that event data may be grouped into context, performance, and historical categories. The performance data may be comprised of information pertaining specifically to the action being simulated. Context data may provide information involving the situation surrounding the action. The historical data may consist of past statistical information for the players involved, for example, over a season, a game, or in a particular scenario.

Each particular sport may have its own unique set of event data, including individualized context, performance, and historical data. A non-limiting example of context data for baseball may include the following: inning, outs, pitch count, player at bat and on deck, base runners, defensive players and pitcher, last play, box score information (e.g., hits, runs, errors, extra base hits, home runs, stolen bases, walks, etc.), scoring plays in the game, projected winner and percentage (based on various factors). Historical data for a baseball game may include, but is not limited to, the following: (1) batter statistics: data for game, season, and versus active pitcher, batting average (including average with runners on base and/or in scoring position), on base percentage (OBP), slugging percentage (SLP), at bats (AB), runs, hits, runs batted in (RBIs), homeruns, extra base hits, strikeouts, walks, and performance of previous at bats in active game; (2) pitcher statistics: data for game, season, and versus active batter, innings pitched, hits, runs, earned runs in current game, earned run average (ERA), strike outs, walks (i.e., base on balls (BB)), walks plus hits per inning pitched (WHIP), wins and losses, and starts. Illustrative and non-restrictive examples of performance data in a baseball game, for example, for a pitch event may include: pitch type, location, trajectory, spin, and speed.

For a football game, non-limiting examples of context data may include the following: score, time remaining, current quarter, down and distance, possession, time outs remaining, current drive information, scoring plays, weather conditions, and for each team, first downs, total plays, total yards broken down into passing and rushing yards, penalty yards, possession time, and turnovers. Illustrative and non-restrictive examples of historical data may include the following: (1) quarterback statistics: passer rating and/or total quarterback rating (QBR), completions, completion percentage, yards, yards per catch, touchdowns, interceptions, hurries, sacks, fumbles; (2) wide receiver statistics: catches, yards, drops, number of times thrown to, number of interceptions when thrown to, performance against particular defensive back(s), rushes; (3) defensive back statistics: interceptions, passes broken up, completions of a particular receiver when being covered by defensive back. Historical Statistics may be provided versus a particular team, season, in-game, and situational (e.g., quarter, score, down, and scenario). Performance data may include, but is not limited to, the following: play data, offensive and defensive play calls, locations of plays (e.g., x, y, z coordinate or yard line locations), ball location, trajectory, and speed, and snap and hold information for field goal or extra point attempts.

Although baseball and football statistics have been described herein, embodiments are not limited to those statistics or to these sports, as other sports are contemplated herein, including, but not limited to, hockey, basketball, tennis, and auto racing at both the professional and collegiate levels, if applicable. In addition, as described above, each sport may be associated with a particular set of statistics either alone or in the historical, context, and performance categories described herein. For example, a hockey game may be associated with data including puck speed, shot angle, goalie save percentage, while a tennis game may be associated with serve or return speed and trajectory information.

Furthermore, a video game system configured according to embodiments may generate one or more calculated statistics based on data obtained from a statistics database, such as an SDR. Calculated statistics may be formulated for each category, including performance, context, and historical. Embodiments provide that calculated statistics may be statistics that are not contained in a particular database, but which may be derived from data stored therein. In a first non-limiting example, a calculated statistic in an auto racing game may be a friction coefficient performance statistic based on tire brand and time of last tire change or pit stop data. The friction coefficient performance statistic may be used, for example, to determine how well a car handles certain turns on a race track in a video game environment. A second non-limiting example provides for a calculated performance statistic in a football game wherein a field goal probability statistic is generated based on field goal attempt distance, the kicker historical statistics (e.g., overall field goal percentage, field goal percentage at attempt distance, or some combination thereof), and weather conditions (e.g., wind direction and speed, precipitation, whether the game is indoors).

Embodiments provide for the simulation of multiple events based on a set of event data, for example, from the perspective of different players. For example, a game player in a first baseball scenario may be the pitcher and the batter statistics may be used to determine the probability of the batter getting a hit. In an illustrative second baseball scenario, the game player may be the batter and the pitch data may be used to present the game player with a particular pitch (e.g., the last pitch thrown in the game or a pitch selected by the player utilizing a pitch selection function). In a first football example, the game player may be the quarterback and the play data in combination with, inter alia, the wide receiver and defensive back statistics may be used determine the probability of a completed pass. Other football examples may include the player acting as a wide receiver or defensive back with the same or similar data being used to determine the probability of a completed pass or interception. A hockey example may involve a game player controlling a goalie and attempting to block one or more shots from a particular game.

Each database utilized by video game systems configured according to embodiments may not present event information in the same format. As such, the video game system, either through software, firmware, or some combination thereof in the video game console, at the video game application level, or both may be comprised of one or more modules configured to retrieve data from one or more databases and arrange or translate them into an appropriate format. In addition, within the video game system, the video game application may differentially handle the event data for event simulation. Certain embodiments may translate authentic, real-world data into video game data. For example, real-world x, y, z coordinate or speed information, or one or more equations representing such real-world data, may be utilized within the video game application as corresponding x, y, z coordinate or speed information. In certain other embodiments, real-world data may be translated into game parameter data, for example, to modify standard animations to approximate real-world performances.

For embodiments that translate authentic, real-world data into video game data, reference points, scaling, and dimensions in the real-world may be different compared to the video game world. For example, pertaining to scale, not only may one foot in the real world equal one millimeter on a display screen, but the geometry of the game world may be modified (e.g., elongated, made smaller, truncated, etc.) to allow the game elements to be displayed on the screen. According to embodiments, one or more scaling factors may be utilized within the game for applying the real-world data to the game elements. A non-limiting example provides that real-world x, y, z coordinate information for a pitch may be scaled according to a pitch scaling factor, and the scaled values used to create the pitch animation within the game.

Translating real-world data into video game data may involve the selection of a common reference point between the real world and the game arranged according to embodiments. An exemplary reference point for a baseball game may be the center of home plate or the pitcher's mound, which may be specified as x, y, z coordinate 0, 0, 0. Each sport and each action may have their own reference point, for example, for a football game, the reference may be the fifty yard line for a pass play or the goal post for a field goal. In an illustrative and non-restrictive baseball game example, the real-world data point may be selected such that the pitch is closest to the center of the plate. If the center of the plate was not the original 0, 0, 0 reference point for the x, y, z data, based on the known real-world distance from the plate to the reference point, the data may be modified to reflect home plate as 0, 0, 0 through a coordinate translation calculation. The new x, y, z data may then be translated using the known scaling factor for the video game, based on the game geometry.

For embodiments that translate real-world data into video game parameter data, the real-world data may be directly translated into corresponding video game parameters utilized by the video game application to generate game animations. For example, for a non-limiting baseball game pitch example, an "amount of curve" parameter may be calculated by plotting out the real-world x, y, z data as a curve and then determining various curve parameters, such as slope, which may be translated into a pitch curve factor used to build the pitch animation. Additional embodiments provide that the real world data may be subjected to certain scaling factors before being translated into video game parameters, as necessary.

Additional embodiments may utilize real-world data to generate one or more intermediate elements that may be utilized within the video game application to generate animations. For example, one or more modules or applications active within a video game system configured according to embodiments may receive real-world data and generate one or more objects, such as image or text files or programming objects, comprising the real-world data. The one or more objects may be imported into the video game application or an object of the video game application (e.g., an animation engine, application plug-in, etc.) and certain video game actions may be built using the one or more imported objects. In a non-limiting baseball game example, real-world pitch data, such as point, velocity, and acceleration data, may be utilized to generate one or more information files for use in generating animations within the video game application. Continuing the example, the pitch data may be used to build a virtual pitch within the video game application, wherein the existing data may be modified for alignment with the simulated pitch within the video game, for example, by changing the initial point of the pitch. According to an alternative embodiment, the same data may be used in combination with the video game application animation elements to modify the pitcher animation to match the data.

Video game systems and video game applications perform animations according to a wide variety of processes. For example, certain video game applications may have a set of rough animations for particular game events and elements (e.g., for each available pitch within the game or for a particular pitcher) that may be considered as "standard" or "template" animations. These rough animations may additionally be associated with one or more parameters, or one or more equations representing such parameters, that may be specified for a particular animation during actual game play. For example, a pitch animation may be associated with speed, trajectory, and amount of curve parameters. In addition, each player in a game may have a set of ranges for each corresponding parameter, such that a particular pitcher may be limited to a top pitch speed or an amount of curve on a curveball. In general, a particular animation may be the product of receiving user input in combination with the final constraint parameters associated with the animation event. For example, a video game application may have a pitch animation process that uses the final parameters with the rough animation to calculate x, y, z coordinates to animate the pitch. These x, y, z coordinates may dictate the animated motion of the ball from the pitcher to home plate (i.e., where in each "frame" of the video the ball appears).

Accordingly, embodiments may be configured to receive real-world data from a database and translate it into a proper format for the virtual world of a particular video game, configure the game to receive real-world data, translate real-world data into the kind of input parameters provided by the user via the game controller and the game parameters, or some combination thereof. In an embodiment translating real-world data into game parameters, all of the simulated player's default parameters may not be needed because they may be completely or partially supplanted by the real-world data. For example, even if a given pitcher has a "95 amount of curve parameter," the simulated pitch may reflect that he threw a pitch with an "80 amount of curve parameter" if that is what he actually threw in the game event being simulated.

Simulated events based on event data as provided herein may be presented to users in various configurations. For example, the challenge of hitting a particular pitch or blocking a specific shot based on a real event may be lessened if the user already knows certain information about the event, such as speed and location. For a baseball game, it might be still be challenging to try to hit the pitch, even if you know exactly what pitch is coming, since it is still hard to get exactly the right swing. Still, it may not be as difficult compared to not having any previous information about the pitch. In addition, in other sports, such as hockey, it might be less challenging to try to block a shot if you know where the shot is coming from since you can just place the virtual goalie over the part of the net where you know the shot is coming. Accordingly, embodiments provide for augmented event simulations wherein the exact sequence of simulated events may be unknown to a user. For example, the user may select a specific pitch or shot, which may be presented to a user within a series of other similar events, either based on other actual events or generated by the video game application. For example, a user may attempt to hit the last ten pitches or last ten shots in a randomized order. As such, the challenge of facing a particular event remains despite the user having already seen the event that forms the basis of the simulation.

Figure 4:
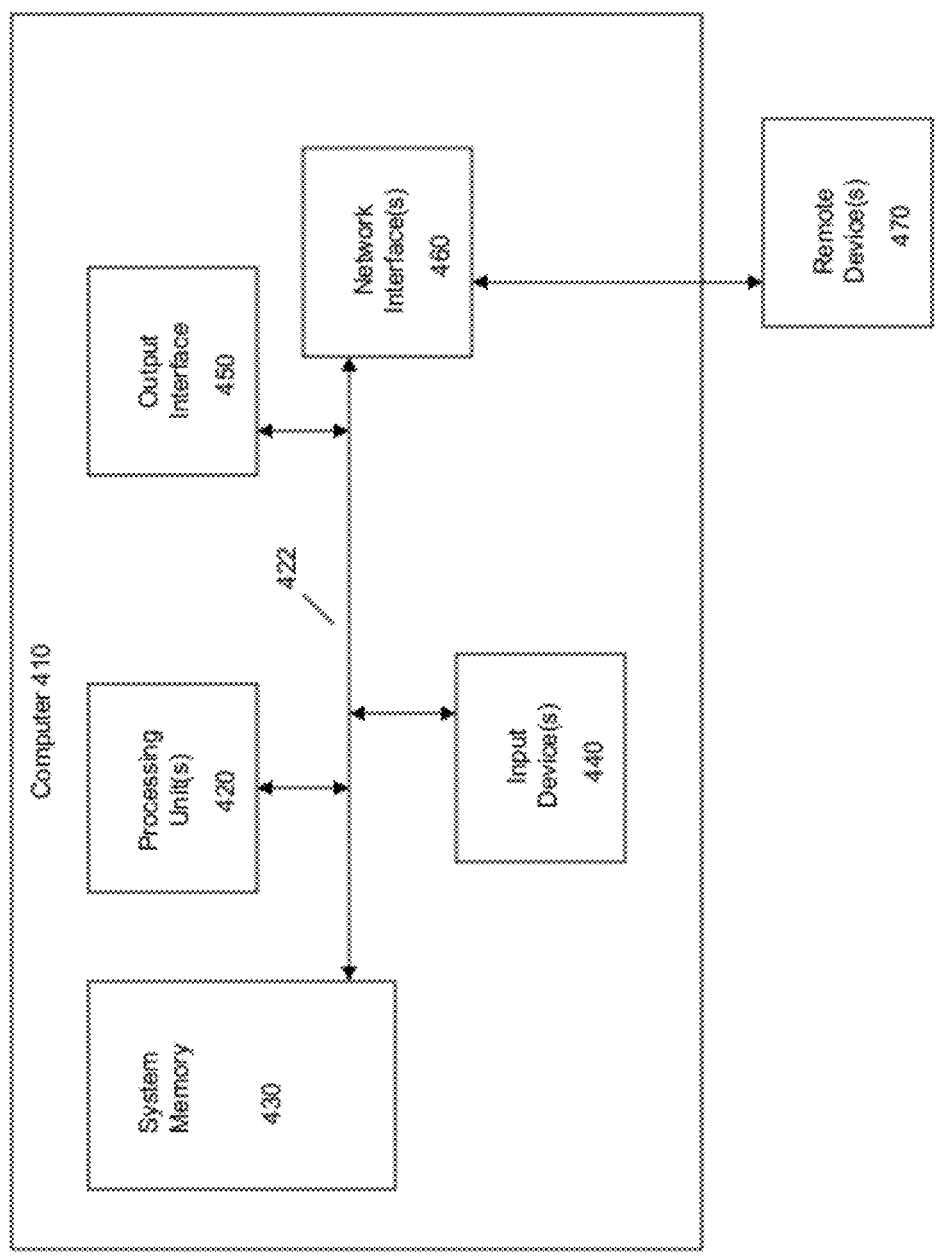
FIG. 4 illustrates an example computing device.

It will be readily understood by those having ordinary skill in the art that a variety of computing devices may be employed in implementing various embodiments. Referring to FIG. 4, an example device that may be used in implementing embodiments includes information handling device 410 in the form of a computer or a mobile phone. In this regard, the information handling device 410 may execute program instructions configured to provide portable virtual pets, and perform other functionality of the embodiments, as described herein.

Components of information handling device 410 may include, but are not limited to, at least one processing unit 420, a system memory 430, and a system bus 422 that couples various system components including the system memory 430 to the processing unit(s) 420. The information handling device 410 may include or have access to a variety of computer readable media. The system memory 430 may include computer readable storage media in the form of volatile and/or nonvolatile memory such as read only memory (ROM) and/or random access memory (RAM). By way of example, and not limitation, system memory 430 may also include an operating system, application programs, other program modules, and program data.

A user can interface with (for example, enter commands and information) the information handling device 410 through input devices 440. A monitor or other type of device can also be connected to the system bus 422 via an interface, such as an output interface 450. In addition to a monitor, information handling devices may also include other peripheral output devices. The information handling device 410 may operate in a networked or distributed environment using logical connections (network interface 460) to other remote computers or databases (remote device(s) 470). The logical connections may include a network, such local area network (LAN) or a wide area network (WAN), a cellular network, but may also include other networks.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects have been described herein with reference to illustrations of methods, apparatuses, systems and computer program products according to example embodiments. It will be understood that some or all of the functionality in the illustrations may be implemented by computer program instructions. These computer program instructions may be provided to a processor of a computer or other programmable data processing apparatus (information handling device) to produce a machine, such that the instructions, which execute via the processor of the computer or other programmable data processing apparatus, create means for implementing the functions/acts specified in the illustrations.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the illustrations.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the illustrations.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A gaming system comprising:
one or more non-transitory memory devices configured to store computer-executable instructions; and
one or more processors, which upon executing the computer-executable instructions are configured to:
receive event data of a plurality of real-world events in sporting contests, the event data including physical movement information of at least one of a person and a sport object moving during one or more events of the plurality of real-world events, the information determined by analyzing image data received from one or more physical sensors monitoring the plurality of real-world events;
index the event data for querying such that a user of a user client gaming system can query for a specific event of the one or more events;
provide to a user client gaming system an option to perform a query for a specific event of the one or more events;
receive, in response to user selection of the option, a query for the specific event;
identify event data relevant to the query of the specific event;
process the event data relevant to the query of the specific event, the processing forming a gaming instruction to configure video graphic simulation data for presentation of a video game simulation of the queried specific event;
communicate the gaming instruction to the user client gaming system for execution of the gaming instruction via a video game application that presents the video game simulation of the queried specific event using video graphic simulation data on a display device of the user client gaming system;
wherein the video game application simulates the queried specific event, based on the video graphics simulation data, for display, at the display device of the user client gaming system, of a video game scenario including the video game simulation; and
receive, from the user client gaming system, game play data associated with the user interacting with the video game scenario via one or more input devices of the user client gaming system.

2. The gaming system according to claim 1, wherein the user client gaming system comprises a video game console.

3. The gaming system according to claim 1, wherein the event data comprises context, performance, and historical data.

4. The gaming system according to claim 1, wherein the event data is stored in one or more specialized data repositories configured to receive real-time sports information.

5. The gaming system according to claim 4, wherein the plurality of real-world events are baseball events comprising one or more pitch events.

6. The gaming system according to claim 1, wherein the event data is translated into one or more parameters utilized by the video game application to generate animated game elements.

7. The gaming system according to claim 1, wherein the event data is utilized to generate one or more calculated statistics.

8. The gaming system according to claim 1, wherein a plurality of simulated real-world events are displayed in a randomized order.

9. The system of claim 1, wherein the event data is derived from television broadcast data.

10. The system of claim 1, wherein the real-world event is an action taken by a player on a team in a real-world athletic contest between two teams using unmodified equipment.

11. A method comprising:
receiving event data of a plurality of real-world events in sporting contests at a computing device, the event data including physical movement information of at least one of a person and a sport object moving during one or more events of the plurality of real-world events, the information determined by analyzing image data received from one or more physical sensors monitoring the plurality of real-world events;
indexing the event data for querying such that a user of a user client gaming system can query for a specific event of the one or more events;
provide to a user client gaming system an option to perform a query for a specific event of the one or more events;
receiving, in response to user selection of the option, a query from a client device for the specific event;
identifying event data relevant to the query of the specific event;
processing the event data relevant to the query, the processing forming a gaming to configure video graphic simulation data for presentation of a video game simulation the queried specific event;
communicating the gaming instruction to the user client gaming system for execution of the gaming instruction via a video game application that presents the video game simulation of the queried specific event using video graphic simulation data on a display device of the user client gaming system;

wherein the video game application simulates the queried specific event, based on the video graphics simulation data, for display, at the display device of the user client gaming system, of a video game scenario including the video game simulation; and receiving, from the user client gaming system, game play data associated with the user interacting with the video game scenario via one or more input devices of the user client gaming system.

12. The method according to claim 11, wherein the user client gaming system comprises a video game console.

13. The method according to claim 11, wherein the event data comprises context, performance, and historical data.

14. The method according to claim 11, wherein the event data is stored in one or more specialized data repositories configured to receive real-time sports information.

15. The method according to claim 14, wherein the plurality of real-world events are baseball events comprising one or more pitch events.

16. A method comprising:

accessing event data of a plurality of real-world events in sporting contests, the event data including physical movement information of at least one of a person and a sport object moving during one or more events of the plurality of real-world events, the information determined by analyzing image data received from one or more physical sensors monitoring the plurality of real-world events;

indexing the event data for querying such that a user of a user client gaming system can query for a specific event of the one or more events;

providing to a user client gaming system an option to perform a query for a specific event of the one or more events;

receiving, in response to user selection of the option, a query for the specific event;

identifying event data relevant to the query of the specific event;

processing the event data relevant to the query, the processing forming a gaming instruction to configure video graphic simulation data for presentation of a video game simulation of the queried specific event;

communicating the instruction to one or more video game applications operating on a client device;

wherein the gaming instruction to the user client gaming system for execution of the gaming instruction via a video game application that presents the video game simulation of the queried specific event using video graphic simulation data on a display device of the user client gaming system;

wherein the video game application simulates the queried specific event, based on the video graphics simulation data, for display, at the display device of the user client gaming system, of a video game scenario including the video game simulation; and receiving, from the user client gaming system, game play data associated with the user interacting with the video game scenario via one or more input devices of the user client gaming system.

* * * * *